June 2, 1931. E. HORN 1,808,112
SPEED INDICATOR WITH SEVERAL MEASURING RANGES
Filed Feb. 26, 1929
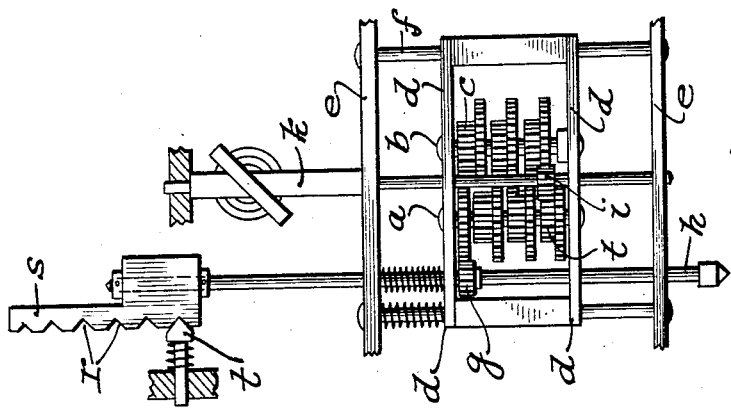
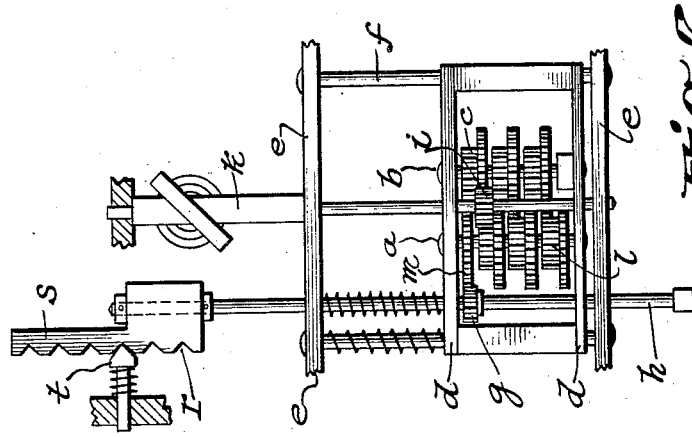
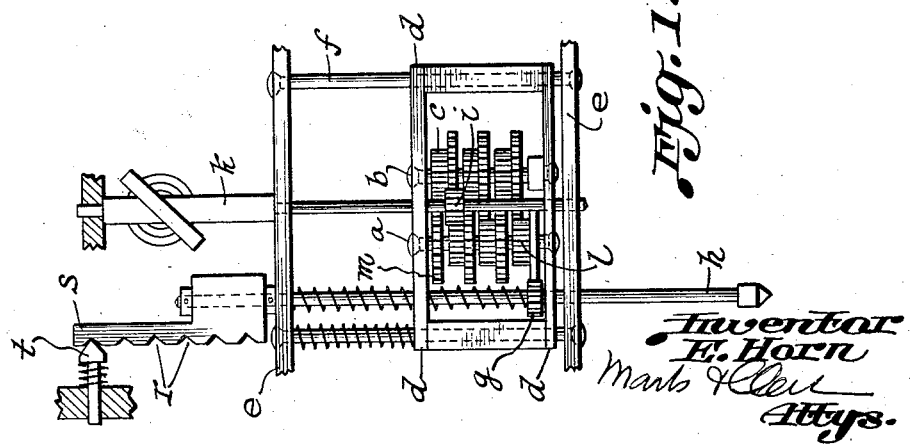
Inventor
E. Horn Patented June 2, 1931

1,808,112

UNITED STATES PATENT OFFICE

ERHARD HORN, OF LEIPZIG, GERMANY

SPEED INDICATOR WITH SEVERAL MEASURING RANGES

Application filed February 26, 1929, Serial No. 342,817, and in Germany November 1, 1928.

Wheel gears heretofore used for speed indicators, particularly of the hand type, operating according to the oscillating pendulum principle for the purpose of increasing the measuring or indicating range have had the disadvantage of being too large in proportion to the size of the mechanism of the indicator.

The present invention has for its object to overcome the above objection and provide a speed indicator of simple and compact construction which is adaptable to various measuring ranges.

In the accompanying drawings wherein an approved embodiment of the invention is illustrated:

Fig. 1 is a side elevation of the transmission gear of a speed indicator constructed in accordance with the invention;

Figs. 2 and 3 are views similar to Fig. 1 showing the parts in two different positions.

Referring to the drawing in detail, $e$ indicates the main frame in which is journalled a shaft provided with a pinion $i$ adapted to drive the indicating mechanism a portion of which is indicated at $k$. The upper and lower portions of the frame $e$ are connected by posts $f$ constituting guides for a slidable carrier $d$ in which latter the intermediate shafts $a$ and $b$ are journalled.

Pairs of transmission gear wheels $l$ and $c$ are mounted on the respective shafts $a$ and $b$ and each pair of gears includes integrally connected wheels of different diameter, the smaller wheels on one shaft meshing with the larger wheels on the other shaft, and all of the gear wheels being mounted for rotation independently of the shafts.

The lowermost gear on the intermediate shaft $a$ is adapted to mesh with the pinion $g$ on the shaft $h$ when the latter is in its normal position as shown in Fig. 1, said shaft being adapted to engage a rotating part whereby movement is imparted thereto. The shaft $h$ is normally retained in its projected position by the tension of a spring confined between the pinion $g$ and the frame $e$, thus permitting the shaft to be moved axially from the position shown in Fig. 1 to that shown in Fig. 2 in which latter position the pinion $g$ meshes with the relatively large gear wheel $m$ at the upper end of the intermediate shaft $a$, said pinion $g$ successively meshing with the large gear wheels of the pairs on the intermediate shaft $a$ during the axial movement of the shaft $h$.

The pinion $i$, in the position of the carrier $d$ shown in Figs. 1 and 2, meshes with the uppermost large gear wheel of those on the intermediate shaft $b$, but when the position of the carrier is shifted, as shown in Fig. 3, the pinion $i$ meshes with the lowermost gear wheel on the shaft $b$, and thus by the relative adjustment of the carrier $d$ and pinion $g$ different speed ratios between the shaft $h$ and the pinion $i$ may be obtained.

A slide $s$ is secured to the axially movable shaft $h$ and is provided with six recesses $r$ corresponding to the six positions which the pinion $g$ assumes. A spring pressed plunger or pin $t$ is selectively engageable in any one of the several recesses $r$ and retains the shaft $h$ in any one of its several adjusted positions.

What I claim is:

A multiple wheel gearing for hand speed indicators, including a frame, a rotatable driven shaft, a pinion on said shaft, a movable carrier in said frame, intermediate shafts supported in said carrier, pairs of intermeshing gear wheels journalled on said shafts, certain of said gear wheels being movable with the carrier into mesh with the driven shaft pinion, an axially movable shaft mounted in said frame, and a pinion on said axially movable shaft selectively engageable with certain of the gear wheels.

In testimony whereof I have signed my name to this specification.

ERHARD HORN.